United States Patent
Logothetis

(10) Patent No.: US 12,376,043 B2
(45) Date of Patent: Jul. 29, 2025

(54) WIRELESS RADIO SYSTEM FOR ADJUSTING PATH LOSS CALCULATIONS

(71) Applicant: AIRSPAN IP HOLDCO LLC, Boca Raton, FL (US)

(72) Inventor: Andrew Logothetis, High Wycombe (GB)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 448 days.

(21) Appl. No.: 17/678,898

(22) Filed: Feb. 23, 2022

(65) Prior Publication Data

US 2022/0312339 A1    Sep. 29, 2022

(30) Foreign Application Priority Data

Mar. 26, 2021  (GB) .................................... 2104345

(51) Int. Cl.
| | |
|---|---|
| *H04B 7/04* | (2017.01) |
| *H04B 7/0426* | (2017.01) |
| *H04W 52/24* | (2009.01) |
| *H04W 52/36* | (2009.01) |

(52) U.S. Cl.
CPC .......... *H04W 52/242* (2013.01); *H04B 7/043* (2013.01); *H04W 52/367* (2013.01)

(58) Field of Classification Search
CPC ... H04W 52/242; H04W 52/367; H04B 7/043
See application file for complete search history.

(56) References Cited

U.S. PATENT DOCUMENTS 4,298,877 A * 11/1981 Sletten ..................... H01Q 3/18
343/837
5,736,959 A * 4/1998 Patterson ........... H04B 7/18589
342/372

(Continued)

FOREIGN PATENT DOCUMENTS

| EP | 2673656 B1 * | 3/2021 | ............. F41G 7/306 |
| NL | 2026793 B1 * | 6/2022 | ............. H01Q 1/246 |

(Continued)

OTHER PUBLICATIONS

GB Exam Report from GB2104345.0 dated Nov. 2, 2023, 4 pages.

(Continued)

*Primary Examiner* — Hai V Nguyen
(74) *Attorney, Agent, or Firm* — Andrew L. Dunlap; Haynes Beffel & Wolfeld LLP

(57) ABSTRACT

There is provided a wireless radio system comprising compensation circuitry to adjust, based on a scan loss of an outgoing signal due to beamforming, a transmission power of the outgoing signal by a scan loss adjustment amount to produce an adjusted signal. Transmission circuitry transmits the adjusted signal and reception circuitry receives an incoming signal at a reception power. Calculation circuitry performs a calculation of a path loss based on a difference between the transmission power and the reception power and adjusts the path loss. Reporting circuitry reports an indication of the path loss adjusted by the calculation circuitry to the base station. The calculation circuitry adjusts the path loss based on the scan loss adjustment amount.

16 Claims, 10 Drawing Sheets

(56) References Cited

U.S. PATENT DOCUMENTS

Figure 1:
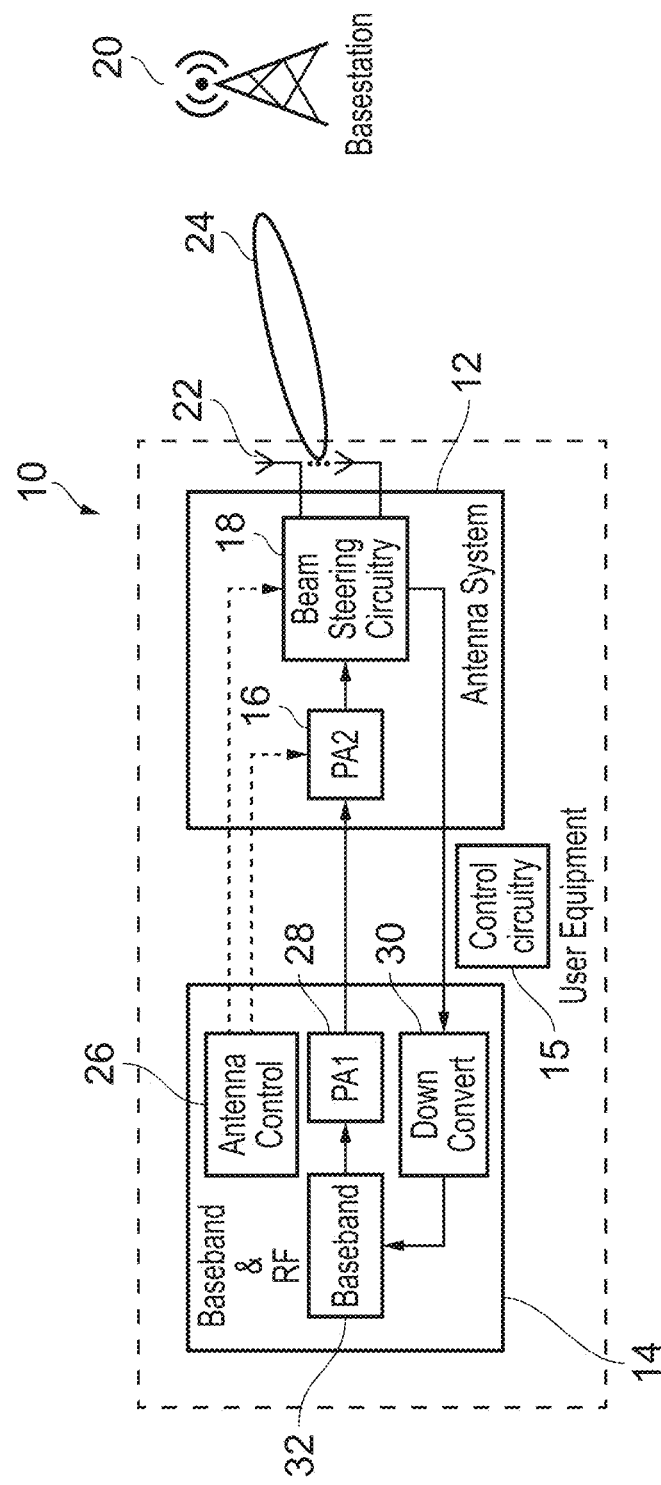

| Patent No. | | Date | Inventor | Classification |
|---|---|---|---|---|
| 6,178,333 | B1* | 1/2001 | Feuerstein | H01Q 21/293 |
| | | | | 455/60 |
| 6,522,897 | B1* | 2/2003 | Martek | H01Q 1/246 |
| | | | | 455/562.1 |
| 7,848,719 | B2* | 12/2010 | Krishnaswamy | H03L 7/087 |
| | | | | 375/372 |
| 7,902,490 | B2* | 3/2011 | DiDomenico | G01S 3/7861 |
| | | | | 126/573 |
| 7,924,495 | B1* | 4/2011 | DiDomenico | F24S 23/00 |
| | | | | 359/316 |
| 8,463,308 | B2* | 6/2013 | Matsuo | H04W 52/46 |
| | | | | 370/328 |
| 8,717,251 | B2* | 5/2014 | Johansson | H01Q 21/24 |
| | | | | 343/893 |
| 8,812,084 | B1* | 8/2014 | Messano, Jr. | A61B 5/05 |
| | | | | 600/475 |
| 9,054,414 | B2* | 6/2015 | Mizzoni | H01Q 19/192 |
| 9,379,438 | B1 | 6/2016 | Runyon et al. | |
| 9,853,712 | B2* | 12/2017 | Jalali | H04B 7/18504 |
| 9,853,715 | B2* | 12/2017 | Jalali | H04B 17/104 |
| 10,015,736 | B2* | 7/2018 | Ong | H04W 52/242 |
| 10,277,269 | B2* | 4/2019 | Ray | H04B 7/18502 |
| 10,396,874 | B1* | 8/2019 | Garrett | H04W 36/18 |
| 10,559,880 | B1* | 2/2020 | Garrett | H01Q 1/241 |
| 10,573,965 | B2* | 2/2020 | Miehle | H01Q 3/36 |
| 10,587,055 | B1* | 3/2020 | Rao | H01Q 5/45 |
| 10,714,841 | B1* | 7/2020 | Rao | H04W 56/0015 |
| 10,728,003 | B2* | 7/2020 | Kim | H04W 72/23 |
| 10,735,169 | B2* | 8/2020 | Kim | H04L 5/0091 |
| 10,911,963 | B1* | 2/2021 | Petersson | H01Q 3/34 |
| 11,016,526 | B2* | 5/2021 | Elgaard | H04B 1/0458 |
| 11,032,751 | B2* | 6/2021 | Arur | H04B 7/195 |
| 11,139,873 | B2* | 10/2021 | Simonsson | H04B 7/0848 |
| 11,239,555 | B2* | 2/2022 | Behdad | H01Q 3/46 |
| 11,258,484 | B2* | 2/2022 | Fang | H04W 52/42 |
| 11,480,669 | B2* | 10/2022 | Keating | H04B 7/088 |
| 11,522,587 | B2* | 12/2022 | Li | H04B 7/0617 |
| 11,522,592 | B2* | 12/2022 | Raghavan | H04B 7/0632 |
| 11,522,652 | B2* | 12/2022 | Jung | H04L 5/0091 |
| 11,536,856 | B2* | 12/2022 | Niesen | G01S 19/49 |
| 11,558,127 | B2* | 1/2023 | Chen | H04B 17/24 |
| 11,575,416 | B2* | 2/2023 | Oteri | H04B 7/0626 |
| 11,581,648 | B2* | 2/2023 | Murch | H01Q 5/49 |
| 11,582,701 | B2* | 2/2023 | Wilhelmsson | H04W 52/242 |
| 11,582,728 | B2* | 2/2023 | El Ayach | H04W 48/12 |
| 11,582,756 | B2* | 2/2023 | Liu | H04W 4/027 |
| 11,588,592 | B2* | 2/2023 | Zhou | H04L 5/001 |
| 11,595,109 | B2* | 2/2023 | Kundargi | H04W 16/28 |
| 11,595,905 | B2* | 2/2023 | Haghighat | H04W 52/367 |
| 11,595,909 | B2* | 2/2023 | Park | H04W 52/146 |
| 11,601,892 | B2* | 3/2023 | Yasukawa | H04W 52/58 |
| 11,632,284 | B2* | 4/2023 | Lincoln | H04W 24/10 |
| | | | | 370/328 |
| 11,652,562 | B2* | 5/2023 | Parkvall | H04L 65/1023 |
| | | | | 370/208 |
| 11,677,140 | B2* | 6/2023 | Stoleru | H01Q 3/24 |
| | | | | 343/705 |
| 11,699,850 | B2* | 7/2023 | Fang | H03F 3/211 |
| | | | | 342/372 |
| 11,729,818 | B2* | 8/2023 | Bertrand | H04W 28/0221 |
| | | | | 370/329 |
| 11,737,030 | B2* | 8/2023 | Li | H04W 52/146 |
| | | | | 455/522 |
| 11,750,279 | B2* | 9/2023 | Semiao | H04B 7/18517 |
| | | | | 455/12.1 |
| 11,758,484 | B2* | 9/2023 | Marupaduga | H04W 88/085 |
| | | | | 370/329 |
| 11,764,867 | B2* | 9/2023 | Sakhnini | H04B 7/18519 |
| | | | | 455/13.4 |
| 11,812,390 | B2* | 11/2023 | Davydov | H04W 52/58 |
| 11,819,247 | B2* | 11/2023 | Keyer | A61B 17/7077 |
| 11,822,205 | B2* | 11/2023 | McManamon | G02B 26/0875 |
| 11,824,816 | B2* | 11/2023 | Shin | H04B 7/0691 |
| 11,832,192 | B2* | 11/2023 | Fukui | H04W 24/08 |
| 11,863,255 | B2* | 1/2024 | Fang | H04B 7/18543 |
| 11,871,289 | B2* | 1/2024 | Comstock | H04W 28/04 |
| 11,881,914 | B1* | 1/2024 | McCormick | H04W 16/28 |
| 11,890,037 | B2* | 2/2024 | Mueller | A61B 17/705 |
| 11,901,985 | B2* | 2/2024 | Awoniyi-Oteri | H04B 7/0408 |
| 11,917,550 | B2* | 2/2024 | Wen | H04W 72/046 |
| 11,924,775 | B2* | 3/2024 | Zhang | H04W 52/245 |
| 12,137,354 | B1* | 11/2024 | McCormick | H04B 7/0634 |
| 2001/0049295 | A1* | 12/2001 | Matsuoka | H04B 7/0617 |
| | | | | 342/368 |
| 2004/0196813 | A1* | 10/2004 | Ofek | H04B 7/0491 |
| | | | | 370/278 |
| 2005/0068249 | A1* | 3/2005 | Frederick du Toit | H01Q 3/242 |
| | | | | 343/757 |
| 2007/0290930 | A1* | 12/2007 | Krishnaswamy | H03L 7/0995 |
| | | | | 331/25 |
| 2008/0188260 | A1* | 8/2008 | Xiao | H04W 52/24 |
| | | | | 455/522 |
| 2008/0297414 | A1* | 12/2008 | Krishnaswamy | H03L 7/087 |
| | | | | 342/368 |
| 2010/0052986 | A1* | 3/2010 | Nink | H01Q 21/29 |
| | | | | 342/372 |
| 2010/0109965 | A1* | 5/2010 | Foo | H01Q 25/00 |
| | | | | 343/836 |
| 2012/0242539 | A1* | 9/2012 | Mizzoni | H01Q 15/147 |
| | | | | 342/354 |
| 2013/0218021 | A1* | 8/2013 | Messano, Jr. | A61B 5/0062 |
| | | | | 600/473 |
| 2013/0307752 | A1* | 11/2013 | Johansson | H01Q 21/205 |
| | | | | 343/893 |
| 2014/0185481 | A1* | 7/2014 | Seol | H04W 52/24 |
| | | | | 370/252 |
| 2015/0131641 | A1* | 5/2015 | Ong | H04W 52/242 |
| | | | | 370/338 |
| 2015/0236779 | A1* | 8/2015 | Jalali | H04B 7/18504 |
| | | | | 342/367 |
| 2016/0105233 | A1* | 4/2016 | Jalali | H04W 16/28 |
| | | | | 342/359 |
| 2016/0172752 | A1 | 6/2016 | Amos et al. | |
| 2016/0286174 | A1* | 9/2016 | Noda | G02B 27/017 |
| 2016/0372835 | A1* | 12/2016 | Toso | H01Q 15/16 |
| 2017/0084994 | A1* | 3/2017 | Tran | H01Q 3/08 |
| 2017/0188391 | A1* | 6/2017 | Rajagopal | H04W 74/0816 |
| 2018/0131089 | A1* | 5/2018 | Yilmaz | H01Q 21/065 |
| 2018/0167102 | A1* | 6/2018 | Ray | H04B 1/7113 |
| 2018/0241461 | A1* | 8/2018 | Jalali | H04B 7/212 |
| 2018/0287691 | A1* | 10/2018 | Jalali | H04W 24/02 |
| 2018/0376429 | A1* | 12/2018 | Islam | H04W 52/146 |
| 2019/0103665 | A1* | 4/2019 | Yoo | H01Q 1/364 |
| 2019/0173568 | A1* | 6/2019 | Jalali | H04W 16/28 |
| 2019/0190677 | A1* | 6/2019 | Kim | H04L 5/0023 |
| 2019/0230568 | A1* | 7/2019 | Arur | H04B 7/195 |
| 2019/0237868 | A1* | 8/2019 | Fang | H03F 1/02 |
| 2019/0296802 | A1* | 9/2019 | Fang | H04B 7/18515 |
| 2019/0348761 | A1* | 11/2019 | Miehle | H01Q 3/36 |
| 2020/0100118 | A1* | 3/2020 | Sun | H04W 16/28 |
| 2020/0135032 | A1* | 4/2020 | Switkes | G05D 1/695 |
| 2020/0168990 | A1 | 5/2020 | Miehle | |
| 2020/0243954 | A1* | 7/2020 | Diamond | H04B 7/195 |
| 2021/0242935 | A1* | 8/2021 | Sakhnini | H04B 7/18543 |
| 2021/0384629 | A1* | 12/2021 | Murch | H01Q 21/062 |
| 2021/0399779 | A1* | 12/2021 | Raghavan | H04B 7/0632 |
| 2021/0409107 | A1* | 12/2021 | Wiegner | H04B 7/04 |
| 2022/0085491 | A1* | 3/2022 | Stoleru | H01Q 21/28 |
| 2022/0123845 | A1* | 4/2022 | Chen | H04B 7/043 |
| 2022/0124512 | A1* | 4/2022 | Winiecki | H04B 17/327 |
| 2022/0178981 | A1* | 6/2022 | Messano | G01R 29/0857 |
| 2022/0182108 | A1* | 6/2022 | Fang | H04W 52/42 |
| 2022/0312340 | A1* | 9/2022 | Logothetis | H04W 52/242 |
| 2022/0344809 | A1* | 10/2022 | Aprile | H01Q 25/002 |
| 2023/0038746 | A1* | 2/2023 | McManamon | G02B 26/101 |
| 2023/0350192 | A1* | 11/2023 | McManamon | G02B 7/10 |
| 2023/0402749 | A1* | 12/2023 | Caratelli | H01Q 21/293 |

(56) References Cited

U.S. PATENT DOCUMENTS

2024/0039146 A1\*   2/2024   Stoleru ................. H01Q 1/286
2024/0154652 A1\*   5/2024   McCormick ......... H04B 17/318

FOREIGN PATENT DOCUMENTS

WO   WO-2022093026 A1 \*   5/2022   ............. H01Q 1/246
WO   WO-2023091083 A2 \*   5/2023   ............... H01Q 3/28

OTHER PUBLICATIONS

GB Examination Report from GB2104347.6 dated Nov. 10, 2023, 6 pages.
GB Search Report from GB2104345.0 dated Aug. 13, 2021 3 pages.
GB Search Report from GB2104347.6 dated Aug. 16, 2021 3 pages.
EP Extended Search Report from EP22161735.0 dated Aug. 31, 2021 12 pages.
EP Search Report from EP22161721.0 dated Jul. 26, 2022, 12 pages.
GB Exam Report from GB2104345.0 dated Jul. 15, 2024, 3 pages.
US Office Action from U.S. Appl. No. 17/697,491 dated May 1, 2024, 14 pages.

\* cited by examiner

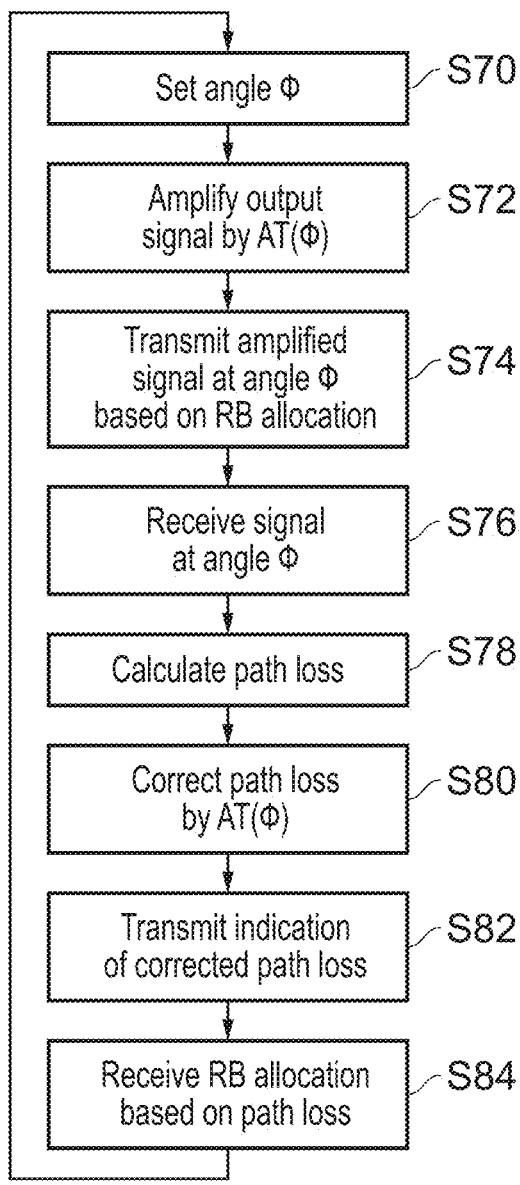
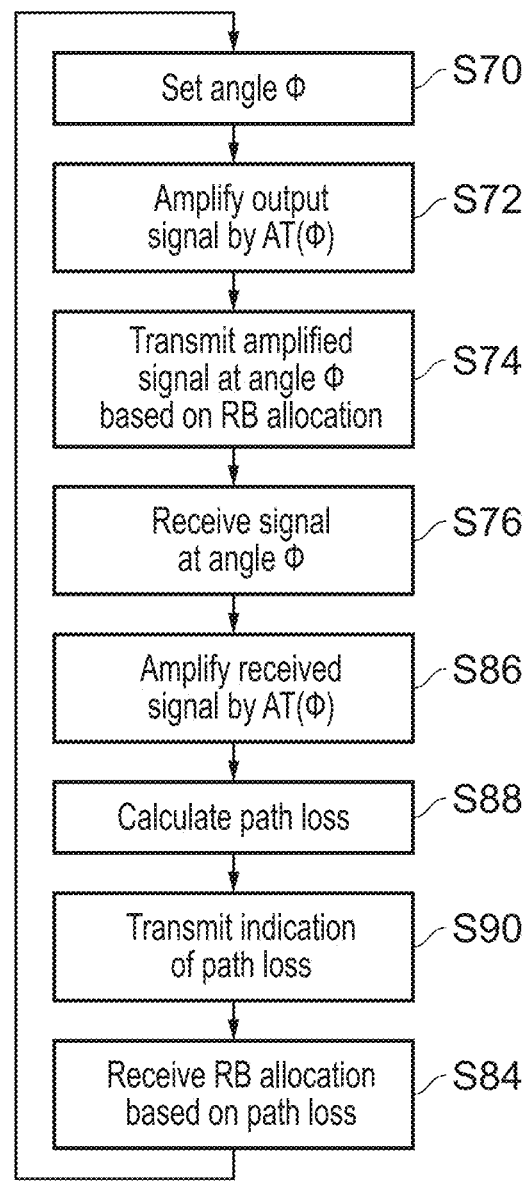
FIG. 6b
FIG. 6c

WIRELESS RADIO SYSTEM FOR ADJUSTING PATH LOSS CALCULATIONS

The present disclosure relates to a wireless radio system and in particular to adjustment of transmission power of the wireless radio system.

Beamforming is used in wireless communication to transmit wireless signals. Such transmission methods suffer from scan losses which are characterised by a reduction in transmission power dependent on the beamforming. In order to improve transmission power the outgoing signal can be adjusted by a scan loss adjustment amount to compensate for the reduction in transmitted power. However, this leads to a discrepancy between the power of the transmitted signal and reception power of an incoming signal and can result in an overall reduction in transmission efficiency.

Viewed from a first example configuration, there is provided a wireless radio system comprising: compensation circuitry to adjust, based on a scan loss of an outgoing signal due to beamforming, a transmission power of the outgoing signal by a scan loss adjustment amount to produce an adjusted signal; transmission circuitry to transmit the adjusted signal; reception circuitry to receive an incoming signal at a reception power; calculation circuitry to perform a calculation of a path loss based on a difference between the transmission power and the reception power, and to adjust the path loss; and reporting circuitry to report an indication of the path loss adjusted by the calculation circuitry to the base station, wherein the calculation circuitry adjusts the path loss based on the scan loss adjustment amount.

Viewed from a second example configuration, there is provided a method comprising: adjusting, based on a scan loss of an outgoing signal due to beamforming, a transmission power of the outgoing signal by a scan loss adjustment amount to produce an adjusted signal; transmitting the adjusted signal; receiving an incoming signal at a reception power; performing a calculation of a path loss based on a difference between the transmission power and the reception power, and to adjust the path loss; and reporting an indication of the path loss adjusted by the calculation circuitry to the base station, wherein the path loss is adjusted based on the scan loss adjustment amount.

Viewed from a third example configuration, there is provided a wireless radio system comprising: means for adjusting, based on a scan loss of an outgoing signal due to beamforming, a transmission power of the outgoing signal by a scan loss adjustment amount to produce an adjusted signal; means for transmitting the adjusted signal; means for receiving an incoming signal at a reception power; means for performing a calculation of a path loss based on a difference between the transmission power and the reception power, and to adjust the path loss; and means for reporting an indication of the path loss adjusted by the calculation circuitry to the base station, wherein the path loss is adjusted based on the scan loss adjustment amount.

Figure 2A:
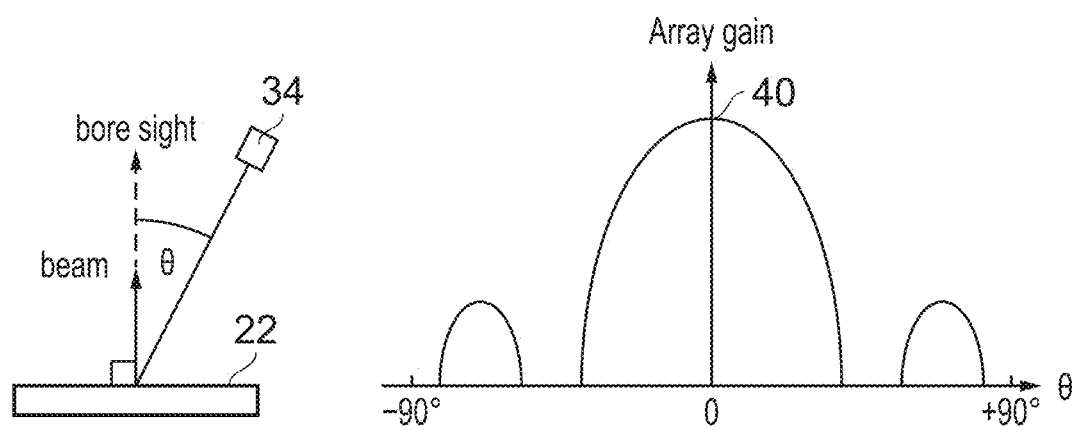
Figure 2B:
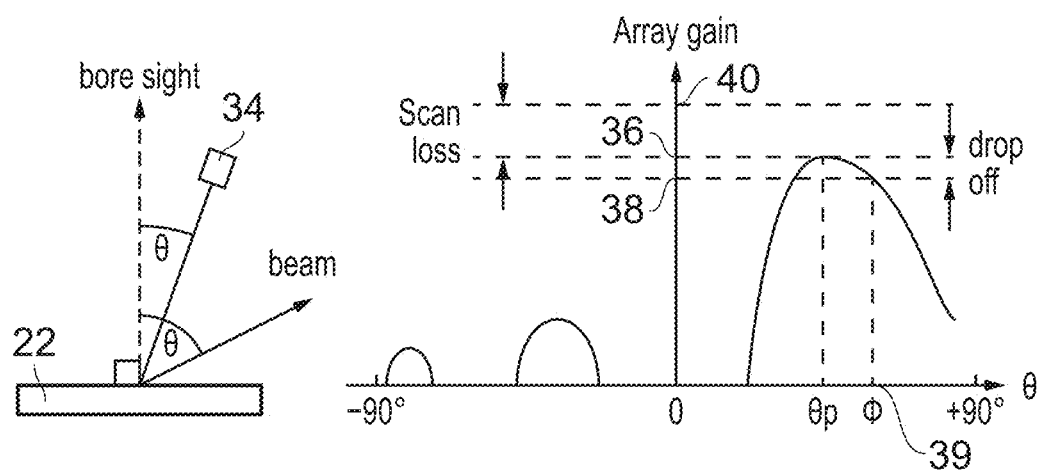
Figure 3A:
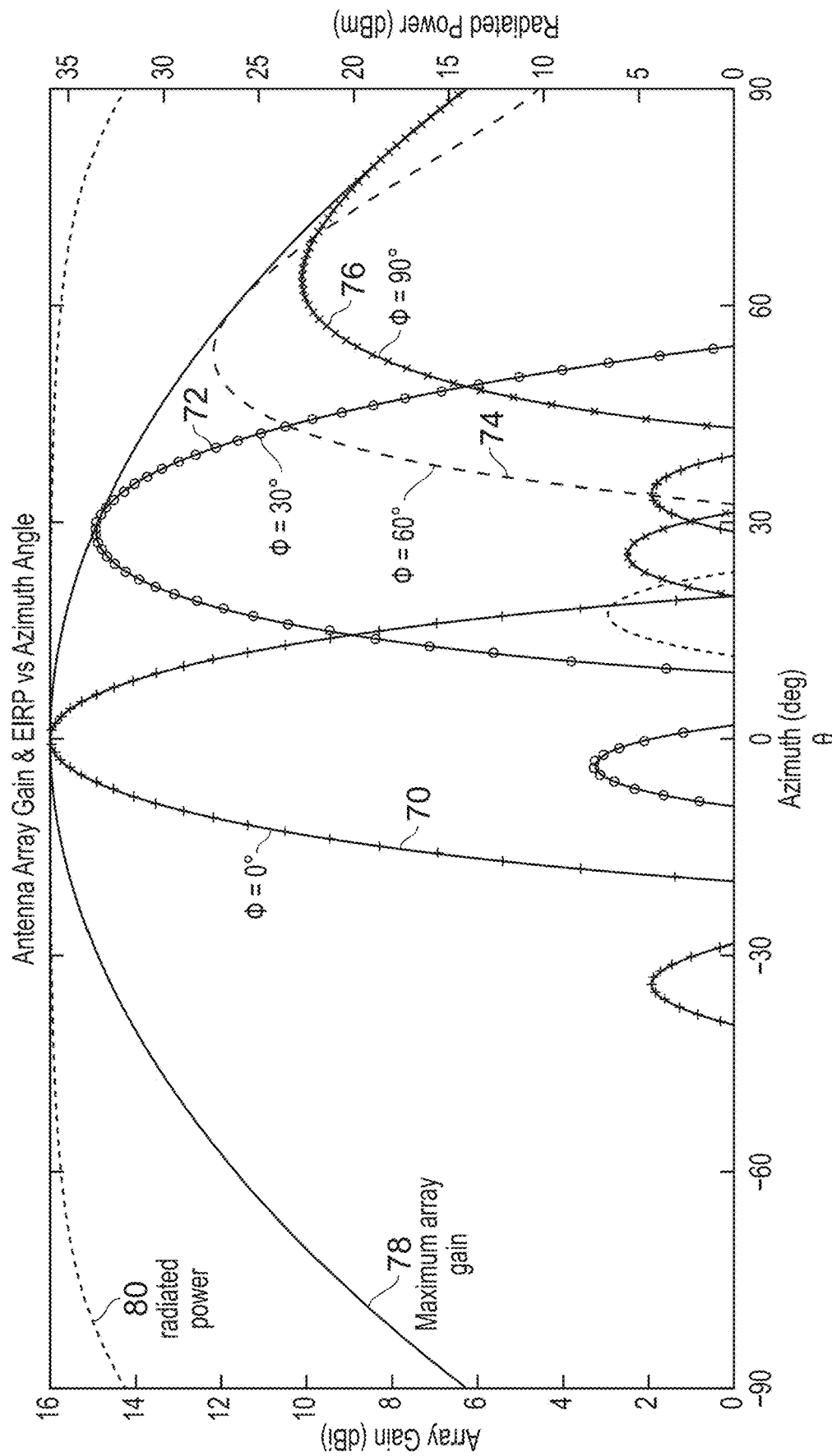
Figure 3B:
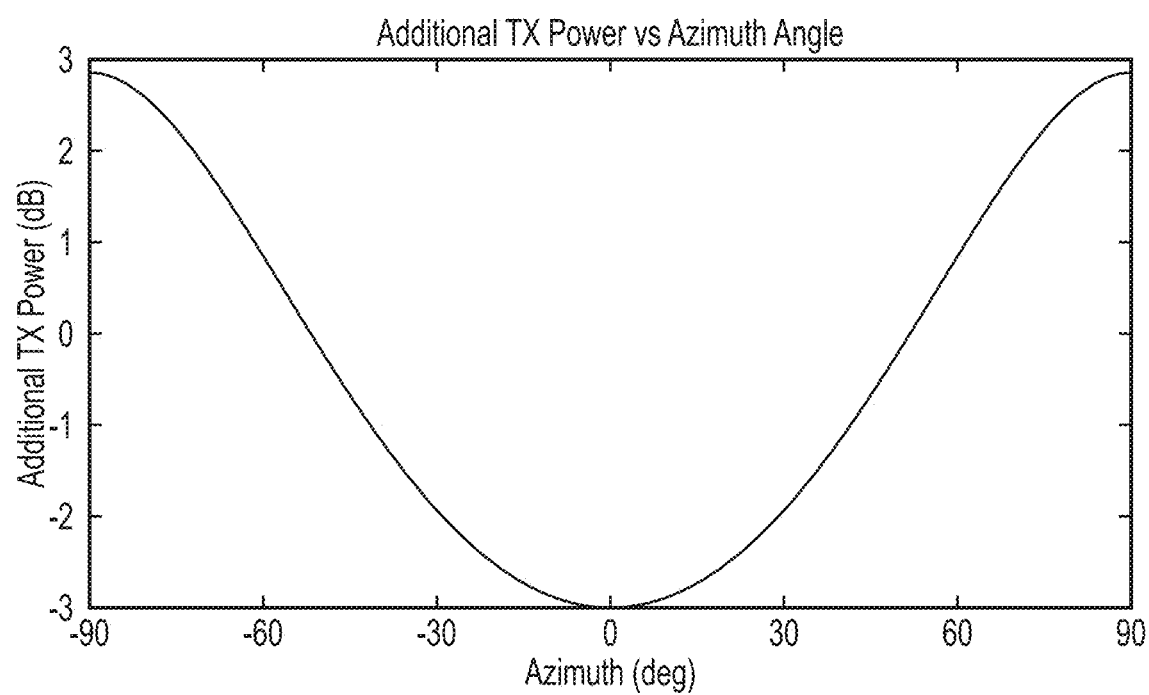
Figure 4A:
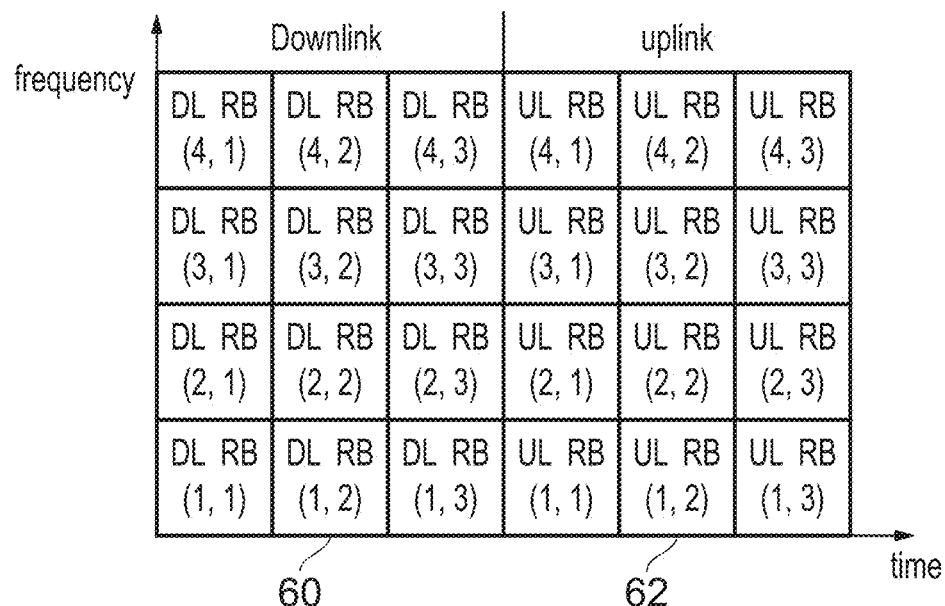
Figure 4B:
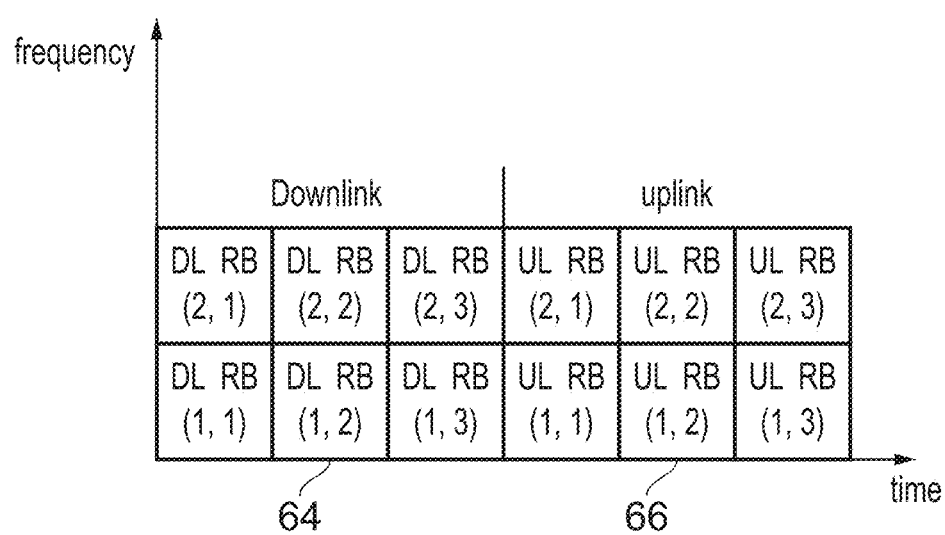
Figure 5:
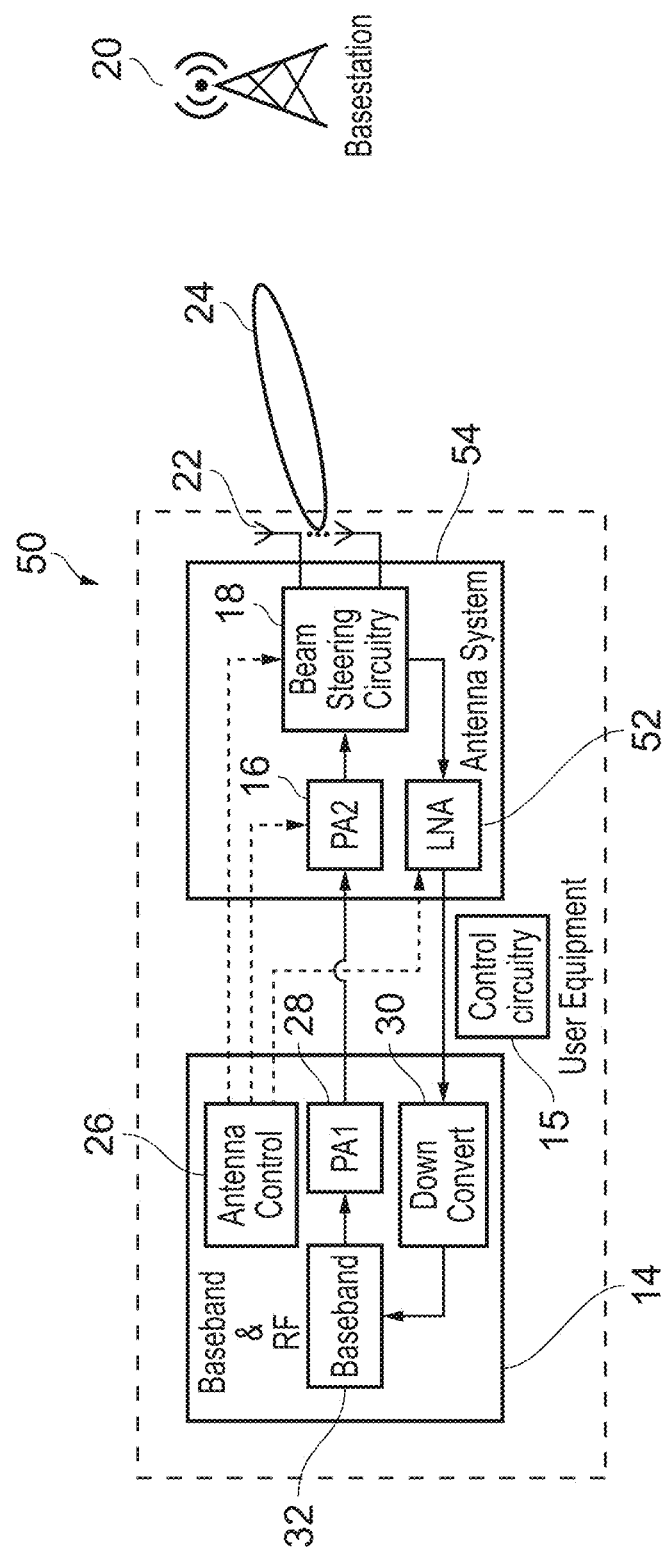
Figure 6A:
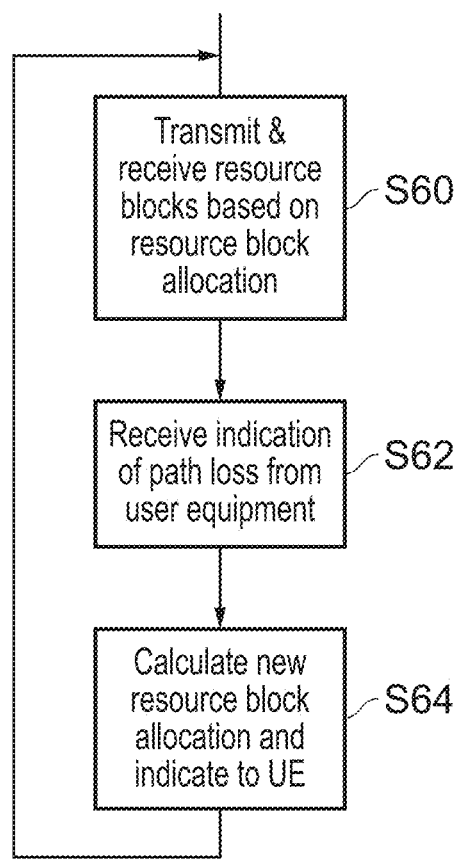
Figure 7:
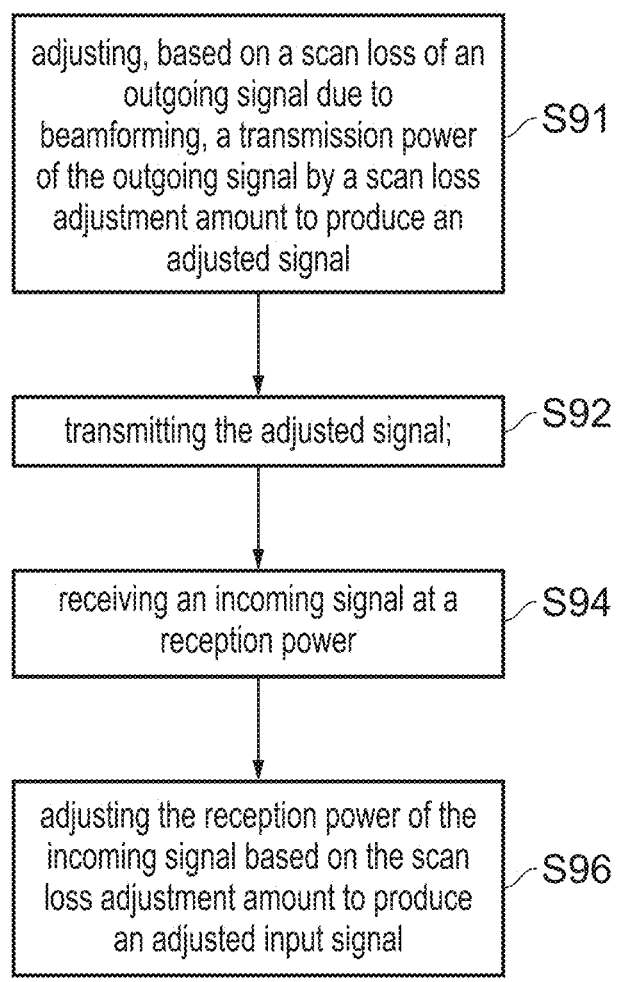
Figure 8:
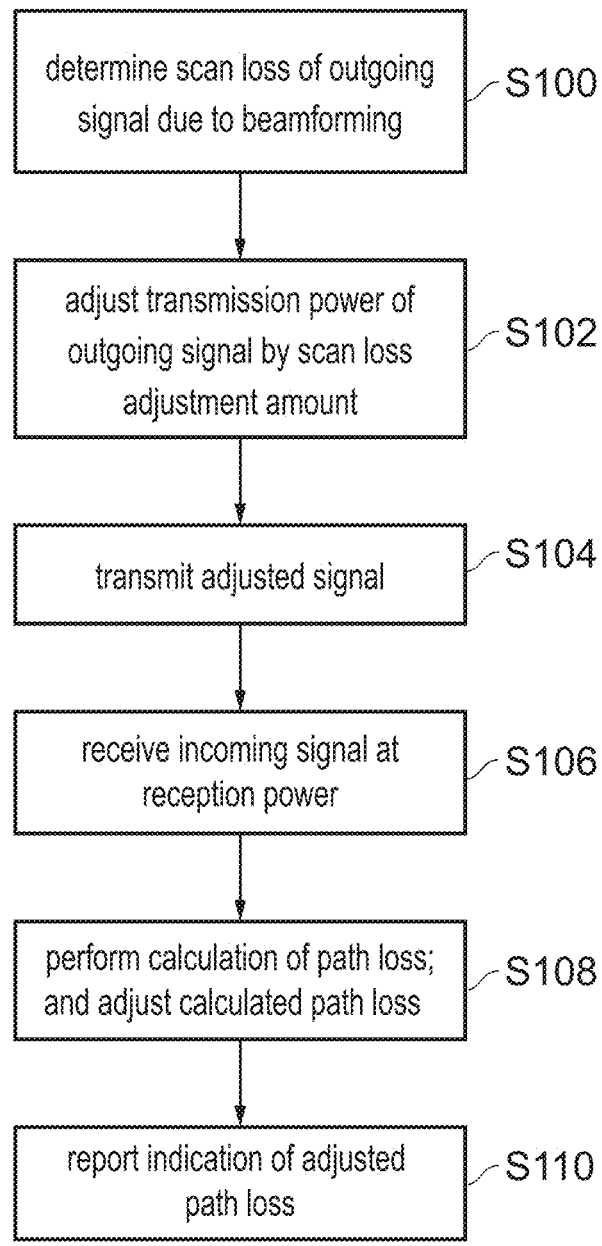

The present technique will be described further, by way of example only, with reference to embodiments thereof as illustrated in the accompanying drawings, in which:

FIG. 1 schematically illustrates a wireless radio system which may embody various examples of the present techniques;

FIG. 2a schematically illustrates array gain of a steered beam which may embody various examples of the present techniques;

FIG. 2b schematically illustrates array gain of a steered beam which may embody various examples of the present techniques;

FIG. 3a schematically illustrates maximum array gain of steered beams which may embody various examples of the present techniques;

FIG. 3b schematically illustrates additional power applied to signals to compensate for scan loss which may embody various examples of the present techniques;

FIG. 4a schematically illustrates resource block allocation which may embody various examples of the present techniques;

FIG. 4b schematically illustrates resource block allocation which may embody various examples of the present techniques;

FIG. 5 schematically illustrates a wireless radio system which may embody various examples of the present techniques;

FIG. 6a schematically illustrates a sequence of steps carried out by a base station which may embody various examples of the present techniques;

FIG. 6b schematically illustrates a sequence of steps carried out by a wireless radio system which may embody various examples of the present techniques;

FIG. 6c schematically illustrates a sequence of steps carried out by a wireless radio system which may embody various examples of the present techniques;

FIG. 7 schematically illustrates a sequence of steps carried out by a wireless radio system which may embody various examples of the present techniques; and FIG. 8 schematically illustrates a sequence of steps carried out by a wireless radio system which may embody various examples of the present techniques.

Before discussing the embodiments with reference to the accompanying figures, the following description of embodiments and associated advantages is provided.

In accordance with one example configuration there is provided a wireless radio system comprising: compensation circuitry to adjust, based on a scan loss of an outgoing signal due to beamforming, a transmission power of the outgoing signal by a scan loss adjustment amount to produce an adjusted signal; transmission circuitry to transmit the adjusted signal; reception circuitry to receive an incoming signal at a reception power; calculation circuitry to perform a calculation of a path loss based on a difference between the transmission power and the reception power, and to adjust the path loss; and reporting circuitry to report an indication of the path loss adjusted by the calculation circuitry to the base station, wherein the calculation circuitry adjusts the path loss based on the scan loss adjustment amount.

The compensation circuitry is provided in order to compensate for the scan loss that occurs due to beamforming. In particular, scan loss (described in more detail below) occurs due to limitations in the transmission power of the transmission circuitry and particularly its inability to transmit at a maximum power over all angles. The compensation circuitry adjusts (e.g. boosts/amplifies, or attenuates) the signal so that the outgoing signal is stronger, in order to compensate for this scan loss. However, when an incoming signal is received, it typically does not have the same adjustment made, and so there is a mismatch between the transmitted power and the received power when calculating the path loss. In these examples, the path loss calculation is adjusted and an adjusted path loss is reported to the base station. The path loss is adjusted based on the scan loss adjustment amount. In this way, a more representative view of the path loss can be considered by the base station for managing the network.

In some examples, the scan loss adjustment amount is limited to a maximum value so that the adjusted signal's transmission power is below a regulatory limit. Regulatory limits could be set by governments in order to prevent either unsafe transmission powers from being used or to restrict interference between users of the radio spectrum. In other examples the regulatory limit could relate to a limit as set in a standard.

In some examples, the transmission circuitry comprises an antenna array to steer a transmission beam corresponding to the outgoing signal at a plurality of angles, wherein the scan loss is dependent on a steered direction, which is one of the plurality of angles at which the transmission beam is steered. Multidirectional antenna arrays can be used to transmit a transmission beam at a variety of angles. These work by using a plurality of transmission elements that are set out along a plane and by varying the phase or the amplitude (or both phase and amplitude) of the signal provided to each of the plurality of antenna elements in order to generate a wave front at a particular steered angle. In these examples, the scan loss is dependent on the steered direction.

In some examples, a gain at the steered angle of the transmission beam transmitted at the steered angle is below a gain at a peak transmission angle of the transmission beam transmitted at the steered angle. When a beam is transmitted at a given angle, it might have a different power at the given angle than at other angles. For instance, if a beam is transmitted at 90 degrees, then the power of that beam at 90 might be 5 dB whereas the power of the same beam at 60 degrees could be 0 dB. That is, the power of the beam changes as one moves away from the steered direction.

In some examples, the scan loss is a difference between a maximum gain of the antenna array across all of the plurality of angles and a maximum gain of the transmission beam transmitted at the steered angle. In other words, the transmission beam is the beam generated at the desired steered angle. The scan loss is a function of the steered angle and, at a given steered angle the scan loss is the difference between a peak power measured for the antenna array across all steered angles and the peak power output measured for the given steered angle In some examples, the transmission circuitry is adapted to transmit the adjusted signal to a wireless node during a subset of a plurality of resource blocks; and the reception circuitry is adapted to receive the incoming signal from the wireless node. The wireless node could, for instance, take the form of a base station. The resource blocks determine an interval (e.g. in time and/or frequency) that can be used by the wireless radio system to transmit the adjusted signal to the wireless node and an interval in time that can be used for the wireless node to communicate with the wireless radio system.

In some examples, the wireless node is configured to allocate the subset of the plurality of resource blocks to the wireless radio system. The base station can therefore participate (possibly with information provided by other nodes) a management role within the network for allocating the resource blocks.

In some examples, the wireless node is configured to allocate the subset of the plurality of resource blocks to the wireless radio system based on the path loss reported by the reporting circuitry of the wireless radio system. The wireless node and the wireless radio system together determine the allocation of resource blocks based on the signal path loss. In particular, the wireless radio system can determine path loss from the wireless node based on knowledge of the transmitted power of the adjusted (transmitted) signal and the received power of the adjusted input (received) signal.

In some examples, the path loss is adjusted by compensating for the scan loss adjustment amount. By adjusting the path loss that is reported to the base station, the scan loss adjustment amount can be compensated for, therefore performing scan loss adjustment without the scan loss adjustment itself influencing the path loss calculation (and therefore the assignment of the resource blocks).

In some examples, the path loss is adjusted by discounting the scan loss adjustment amount. For example, the path loss could be adjusted by subtracting the scan loss adjustment amount from the rest of the path loss calculation. In this way, the scan loss adjustment amount has no bearing on the path loss calculation.

In some examples, the compensation circuitry is an amplifier. The amplifier can therefore perform amplification on the outgoing signal by the scan loss adjustment amount. In other embodiments, the compensation circuitry might attenuate the outgoing signal based on the scan loss adjustment amount to produce the adjusted signal.

In some examples, the outgoing signal and the adjusted signal are RF signals. Radio frequency (RF) signals can be used to transmit data over a large range.

In some examples, the wireless radio system comprises further compensation circuitry to adjust a power of a baseband signal to produce the outgoing signal at the transmission power.

The present technique can also be configured in the following ways:

At least some related examples provide a wireless radio system comprising: compensation circuitry to adjust, based on a scan loss of an outgoing signal due to beamforming, a transmission power of the outgoing signal by a scan loss adjustment amount to produce an adjusted signal; transmission circuitry to transmit the adjusted signal; reception circuitry to receive an incoming signal at a reception power; and input adjustment circuitry configured to adjust the reception power of the incoming signal based on the scan loss adjustment amount to produce an adjusted input signal.

In order to compensate for the scan loss, there is provided compensation circuitry to adjust/amplify the outgoing signal by the scan loss adjustment amount and to increase the power of the outgoing signal. However, the inventors have realised that such adjustment leads to a discrepancy between the transmitted power and the received power. This discrepancy can result in a reduction in throughput of the wireless radio system. Hence, the wireless radio system is provided with input adjustment circuitry to adjust the reception power of the incoming signal based on the scan loss adjustment amount. The adjustment can take various forms, for example, the incoming signal can be adjusted by the scan loss adjustment amount such that a same adjustment is applied to both the outgoing signal and the incoming signal. In this way the outgoing signal is adjusted/amplified to compensate for the scan loss and the discrepancy introduced by the compensation circuitry is overcome. Alternatively, the adjustment circuitry could be configured to adjust/amplify the incoming signal to further compensate for additional adjustment/amplification applied to the incoming signal when it was transmitted.

The precise form of the scan loss adjustment amount can vary depending on implementation. However, in at least some related examples the scan loss adjustment amount is limited to a maximum value so that the adjusted signal's transmission power is below a regulatory limit. Due to the regulatory limits, the power of the outgoing signal cannot be boosted arbitrarily. In addition, as the scan loss is dependent on the beamforming the effects of the scan loss may be greater in some cases than in others. As a result the scan loss adjustment amount depends on the beamforming and the compensation circuitry adjusts the outgoing signal to provide power output limited by the regulatory limit independent of the beamforming.

In at least some related examples the transmission circuitry comprises a plurality of antenna elements to steer a transmission beam at a plurality of angles, and wherein the scan loss is dependent on a transmission angle of the plurality of angles. The antenna elements form a wireless antenna array to transmit, as the transmission beam, the adjusted signal. Due to scan losses the plurality of antenna elements output the transmission beam with power that is dependent on the transmission angle. For example, a beam transmitted in a direction normal to the surface of the antenna elements may have a peak power that is higher than a beam transmitted at an angle that is different from the direction normal to the surface of the antenna elements. In such related examples, in order to compensate for the scan loss, the scan loss adjustment amount is dependent on the transmission angle of the plurality of angles.

In some related examples the transmission angle is determined based on at least a relative phase shift between signals transmitted from adjacent elements of the plurality of antenna elements. By varying the phase of the signal provided to adjacent elements of the plurality of antenna elements, the antenna elements can be configured to transmit radio waves that add up constructively in the beam steering direction resulting in a transmission beam that is transmitted in the direction of the beam steering angle.

The variation in power output by the antenna array for different angles (array gain) contributes to determine the power output by the antenna array. Ideally, the gain in the direction determined by the steered angle would be the peak gain output by the antenna array for that beam steering angle. However, in at least some related examples a gain at the steered angle of the transmission beam transmitted at the steered angle is below a gain at a peak transmission angle of the transmission beam transmitted at the steered angle. This is because, when generating radio waves that add up constructively in the beam steering direction, constructive interference also occurs in a direction different to the steered angle. For a beam transmitted at the steered angle, a peak gain may be observed at a peak transmission angle that is different to the steered angle. The difference between the peak gain and the gain at the steered angle is referred to as the drop off. For beam steering angles for which the drop off is non-zero, it is not possible to amplify the signal at the steered angle to the regulatory limit without exceeding the regulatory limit at the peak transmission angle. In such related examples, the scan loss adjustment amount is chosen to compensate for the scan loss whilst taking the drop off into account. For example, the scan loss adjustment amount is limited by the drop off. In this way signal power can be amplified without exceeding the regulatory limit.

In at least some related examples the scan loss is a difference between a maximum gain of the antenna array across all of the plurality of angles and a maximum gain of the transmission beam transmitted at the steered angle. In other words, the transmission beam is the beam generated at the desired steered angle. The scan loss is a function of the steered angle and, at a given steered angle the scan loss is the difference between a peak power measured for the antenna array across all steered angles and the peak power output measured for the given steered angle.

In at least some related examples the transmission circuitry is adapted to transmit the adjusted signal to a wireless node during a subset of a plurality of resource blocks; and the reception circuitry is adapted to receive the incoming signal from the wireless node. The wireless node can take different forms. However in some related examples, the wireless node is a base station with which the wireless radio system is in communication. The resource blocks determine an interval (e.g. in time and frequency) that can be used by the wireless radio system to transmit the adjusted signal to the wireless node and an interval in time and frequency that can be used for the wireless node to communicate with the wireless radio system.

In at least some related examples the wireless node is configured to allocate the subset of the plurality of resource blocks to the wireless radio system. The wireless node allocates the resource blocks to be used by the wireless radio system defining when the wireless radio system can transmit the adjusted signal and receive the incoming signal.

In at least some related examples the wireless radio system further comprises: calculation circuitry to perform a calculation of signal path loss; and reporting circuitry to report an indication of the path loss to the wireless node, wherein the wireless node is configured to allocate the subset of the plurality of resource blocks to the wireless radio system based on the path loss reported by the reporting circuitry of the wireless radio system. The wireless node and the wireless radio system together determine the allocation of resource blocks based on the signal path loss. In particular, the wireless radio system can determine path loss from the wireless node based on knowledge of the transmitted power of the signal transmitted by the wireless node and the received power of the adjusted input (received) signal. The wireless radio system is therefore able to report an accurate value for the signal path loss to the wireless node. As a result the allocation of resource blocks is accurately carried out resulting in an increased transmission efficiency. In some related examples the power of the signal transmitted by the base station is encoded into the signal transmitted by the wireless node. In alternative related examples, the power of the signal transmitted by the base station is known a-priori by the wireless radio system.

In at least some related examples the wireless node is at an angle that differs from an angle at which any of the antenna elements has its peak gain. The wireless node is at an angle defined as the angular difference between a direction normal to the surface of the antenna elements and a direction of the wireless node from the surface of the antenna elements. The angle at which any of the antenna elements has its peak gain is defined as the angular difference between the direction normal to the surface of the antenna elements and a direction from the surface of the antenna elements in which the peak gain is measured. The angle of the wireless node differs from the angle at which any of the antennal elements has its peak gain when the direction of the wireless node from the antenna elements is not the same as the direction in which the peak gain is measured. As discussed this difference is due to the drop off associated with the antenna elements and is taken into account in the scan loss adjustment amount.

In at least some related examples the compensation circuitry is an amplifier. The gain applied by the amplifier is dependent on a steered angle of the transmission beam and is set to the scan loss adjustment amount to amplify the outgoing signal at the steered angle to produce the adjusted signal.

In some related examples the input adjustment circuitry is an amplifier. The gain of the input adjustment circuitry is also set to the scan loss adjustment amount to amplify the incoming signal at the steered angle to produce the adjusted input signal.

In some related examples the amplifier is a low noise amplifier. The low noise amplifier amplifies the incoming signal without significantly degrading its signal to noise ratio. In this way an accurate measurement of path loss can be determined from the adjusted incoming signal.

In at least some related examples the outgoing signal and the adjusted signal are RF signals. RF (Radio Frequency) signals provide the means to transmit information over large distances enabling communication between the wireless radio system and a base station.

In at least some related examples the wireless radio system comprises further compensation circuitry to adjust a power of a baseband signal to produce the outgoing signal at the transmission power. The further compensation circuitry, which adjusts/amplifies the baseband signal can take different forms. However, in some related examples, the further compensation circuitry is an amplifier. The role of the further compensation circuitry is to amplify the outgoing signal, subject to particular power constraints, which constrain the power output of the baseband unit, to improve communication with the compensation circuitry and the antenna array.

Particular embodiments will now be described with reference to the figures.

In air to ground wireless communication, user equipment on an aircraft must communicate with a base station situated in a fixed location. This is achieved through the use of a steerable antenna mounted on the aircraft. The antenna is typically composed of an array of antenna elements and beam steering circuitry to direct a wireless communication beam towards the base station.

FIG. 1 illustrates a wireless radio system according to some embodiments. The wireless radio system comprises user equipment 10 and base station 20. The user equipment 10 comprises a baseband and RF unit 14, control circuitry 15, antenna system 12, and antenna array 22. The antenna system 12 can be located in a position that is physically distinct from the baseband and RF unit 14 within an aircraft. For example, the antenna system could be located under the fuselage on an aircraft and the baseband and RF unit 14 could be located within the aircraft cockpit. The control circuitry 15 could comprise calculation circuitry and/or reporting circuitry which will be further discussed below. The baseband and RF unit 14 comprises antenna control circuitry 26, a first power amplifier 28 (PA1), a down convert unit 30 and a baseband unit 32. The baseband unit 14 is configured to operate subject to particular power constraints which constrain the power output of the baseband unit 14 to lower than the power output by the antenna system 12. The role of the first power amplifier 28 is to adjust/amplify the power output by the baseband unit 32 to improve communication with the antenna array. The power output by the baseband unit is constrained by the power constraints of the baseband and, hence, it is not suitable for long range communication with the base station 20. The role of the antenna system 12 is to adjust/amplify the power of the signal received from the baseband unit 32 for communication with the base station 20. Within antenna system 12 there is provided a second power amplifier 16 (PA2) to compensate for scan loss, which is described in detail below. Antenna control unit 26 instructs the beam steering circuitry 18 to adjust the relative phase of signals transmitted to adjacent antenna elements of the antenna array 22 to generate a directional beam. For example, if each of the elements of the antenna array transmits in phase with the adjacent antenna elements of the antenna array 22, then a beam is generated in a direction normal to the surface of the antenna array. As discussed, the transmitted power of the beam 24 formed by the antenna array 22 is dependent on the beam steering angle and is referred to as the array gain.

FIGS. 2a and 2b illustrate the variation in array gain as a function of the beam steering angle and the angle at which the array gain is measured. In addition to transmitting power in the direction intended by the beam steering angle, a signal from the antenna array can be measured at a range of angles. FIG. 2a illustrates the array gain measured for a range of angles for a beam directed with a beam steering angle such that the beam is transmitted in the direction normal to the surface of the antenna array. In the illustrated embodiment, beam steering circuitry 18 (not shown) causes antenna array 22 to generate a beam with a beam steering angle of zero degrees such that the beam is transmitted in the direction normal to the surface of the antenna array. As discussed, power is not solely transmitted in this direction. Rather, if array gain were to be measured using power meter 34 oriented at an angle $\vartheta$ to the normal to the surface of the antenna array, an array gain as illustrated in FIG. 2a may be observed. In this example, the peak array gain 40 occurs at the beam steering angle with array gain dropping off rapidly as the power meter is moved away from this angle. In contrast, FIG. 2b schematically illustrates the array gain produced when the beam steering circuitry 18 causes antenna array 22 to generate a beam with an steering angle $\phi$ to the normal to the surface of the antenna array. In this case, the array gain is seen to have a peak gain 36 at angle $\vartheta_p$ that is lower than the peak gain 40 observed when the beam steering angle was zero degrees. The difference between the zero degree peak 40, i.e., the maximum gain over all beam steering angles and the maximum gain 36 for the beam steered at angle 39 ($\vartheta=\phi$) is referred to as scan loss. In addition, the peak gain 36 is observed at an angle that is not equal to that of the beam steering angle $\phi$. The difference between the peak array gain observed 36 at an angle $\vartheta=\vartheta_p$ and the array gain at the beam steering angle 38 ($\vartheta=\phi$) is referred to as the drop off.

FIG. 3a illustrates an example of array gain for four beams steered at beam steering angles: $\phi=0$ (line 70), $\phi=30$ (line 72), $\phi=60$ (line 74) and $\phi=90$ (line 76) degrees. The beams are generated using a uniform linear array of antenna elements. Note the maximum gain is at the normal to the surface of the antenna array, i.e. at 0 degrees yielding, e.g., an array gain of 16 dBi. The solid line (line 78) illustrates the maximum array gain as the beam steering angle $\phi$ is swept from −90 to 90 degrees. The minimum array again is observed at the end-fire of the array, i.e. $\phi=-90$ or $\phi=90$ degrees yielding, e.g., 6.3 dBi. In the absence of regulatory limits, it would be theoretically possible to amplify the signal using the second power amplifier 16 to compensate for the difference between the maximum gain over all beam steering angles and the gain for the beam steered at angle 39 ($\vartheta=\phi$) measured at the beam steering angle 39 ($\vartheta=\phi$). However, due to the drop off, if the second power amplifier was set to compensate for this difference, then a peak power greater than the zero degree peak would be observed. For the example illustrated in FIG. 2b, if the second power amplifier 16 was used to amplify the beam with steering angle $\phi$ such that the total gain (the sum of the array gain and the gain provided by the second power amplifier) at the steering angle was equal to the regulatory limit, then a peak gain resulting in a power output greater than the regulatory limit would be observed for beam steering angle $\phi$ at the angle $\vartheta_p$.

As a result the gain of the second power amplifier 16 for a beam steered at beam steering angle ϕ is proportional to the scan loss. The resulting radiated power for beam steering angle ϕ measured at angle ϑ=ϕ is illustrated schematically by in FIG. 3a (line 80) corresponding to the radiated power labelled on the right hand axis. The decrease in radiated power observed as the angle is swept from ϕ=−90 to ϕ=90 is a result of the drop off and is required to maintain a radiated power for beam steering angle ϕ below the regulatory limit when measured at an angle different to the beam steering angle (ϑ≠ϕ). The corresponding additional power that is required by the second power amplifier 16 is illustrated in FIG. 3b.

The inclusion of the second power amplifier 16 allows the power of the transmitted signal to be increased to the regulatory maximum minus the drop off over the whole range of beam steering angles ϕ. It is usually expected that an increase in transmitted power would result in a stronger and therefore faster wireless connection between the user equipment 10 and the base station 20. The inventors have realised that this is not the case. Rather, the amplification of the transmitted signal using the second power amplifier 16 causes a discrepancy between the Reference Signals Received Power (RSRP) at the base station 20 and the RSRP at the user equipment 10. Thus, depending on the azimuth direction, the RSRP at the base station 20 follows line 80, while the RSRP at the user equipment 10 follows line 78. This is because of the additional power that has been added by the second power amplifier 16, which causes the angle dependent received power to differ by the amount illustrated in FIG. 3b. In other words, the user equipment measures a weaker signal coming from the base station than the base station measures as coming from the user equipment. This discrepancy causes significant problems to the link since the user equipment 10, as per the 5G standard, reports the transmission loss (path loss), based on the RSRP at the user equipment 10, to the base station 20 which in turn allocates resource blocks to the wireless radio system. Specifically, the control circuitry 15 comprises calculation circuitry and/or reporting circuitry. The calculation circuitry performs a calculation of a transmission loss based on a difference between the transmission power and the reception power. The reporting circuitry reports an indication of the transmission loss to the base station. Since the transmission loss does not account for the additional power provided by the second power amplifier 16 this discrepancy can cause the base station to allocate an incorrect number of resource blocks.

FIG. 4a illustrates an example resource block allocation, where resource blocks are allocated by the base station using frequency division multiplexing and time division multiplexing. In particular, resource blocks are allocated for the downlink 60 from the base station and the uplink 62 to the base station. In this example, 12 resource blocks are illustrated in for each of the downlink 60 and the uplink 62. The resource blocks 60, 62 are used for transfer of information between the base station 20 and the user equipment 10. The number of resource blocks allocated (M') by the scheduler at the base station 20 is based on a previously known number of resource blocks (M) and the change in path loss (ΔPL) calculated at the user equipment 10 and measured in dB. In the illustrated embodiment, the number of resource blocks is given by $$M' = M \times 10^{-\frac{\Delta PL}{10}}.$$

For example, assuming the additional power of the second power amplifier 16 at a given beam steering angle ϕ is 3 dB corresponding to the signal being transmitted by the antenna array having twice the power of signal transmitted by the base station, then the path loss reported by the user equipment 10 will have a 3 dB error (ΔPL=3). This under reporting by the user equipment translates into halving the number of allocated resource blocks (M'=M×10$^{-0.3}$=0.5M), which is a loss of 50% in throughput. On the other hand, over reporting by 1 dB will cause the base station 20 to initially select the wrong level of the Modulation and Coding Scheme (MCS) resulting in higher than expected packet error rate and thus a loss of throughput. Hence, counterintuitively, by increasing the transmitted power the overall throughput of the wireless system can be reduced. FIG. 4b illustrates a resource block allocation, in which the number of resource blocks are allocated to each of the uplink 64 and the downlink 66 is halved, for example, due to the described path loss calculation. Hence, by increasing the power of the signal transmitted from the user equipment 10, the number of resource blocks available for transmission is halved.

The inventors have realised that this problem can be overcome by modifying the user equipment 10 to compensate for this discrepancy. In some embodiments the user equipment 10 corrects measurements of the path loss by applying updates at the software level to a number of reports. In other words, where the path loss is included in calculations relevant to reporting power transmission for the purpose of resource allocation, a correction is applied to the path loss that is equal to the additional power provided by the second power amplifier 16. In particular, the following reports of the uplink physical channels are corrected:

PRACH (Physical Random Access Channel)
SRS (Sounding Reference Signal)
PUSCH (Physical Uplink Shared Channel)
PUCCH (Physical Uplink Control Channel)
PHR (Power Headroom Reporting)

In particular the calculated path loss measure at the user equipment 10 is adjusted by subtracting, from the original path loss measure, a quantity equal to the scan loss, i.e., the additional (beam steering angle ϕ dependent) power provided by the second power amplifier 16. We denote this correction factor ΔT(ϕ). The original path loss measure is calculated at the user equipment 10 by subtracting the base station 20 transmitted power from the received RSRP measurement where the base station 20 transmitted power is advertised by (transmitted from) the base station during the sign-on/registration process. In particular, the following corrections are applied to the reports of the physical channels.

The uplink PUSCH (Physical Uplink Shared Channel) power control at the user equipment 10 is calculated including the subtraction of the correction factor AT(ϕ) from the path loss PL. For example, the PUSCH power can be calculated as the minimum of the configured uplink transmit power $P_{CMAX}$ and the sum of the nominal user equipment transmit power $P_{O\_PUSCH}$, the modulation and coding scheme offset $\Delta_{TF}$, the closed loop power control f, a quantity ten times the logarithm of allocated resource blocks for PUSCH $M_{RB}^{PUSCH}$, and the correction factor AT(ϕ) subtracted from the path loss PL multiplied by the fractional power control multiplier α which is set to compensate. The uplink PUSCH (Physical Uplink Shared Channel) power control modified by the correction factor can also be expressed as follows:

$$P_{PUSCH}(\phi) = \min\left\{ \begin{array}{l} P_{CMAX} \\ P_{O\_PUSCH} + 10\log_{10}(M_{RB}^{PUSCH}) + \alpha PL - \alpha AT(\phi) + \Delta_{TF} + f \end{array} \right. \quad (1)$$

where
$P_{CMAX}$: Configured uplink transmit power
$P_{O\_PUSCH}$: Nominal user equipment transmit power
$M_{RB}^{PUSCH}$: Allocated Resource Blocks
$\alpha$: Fractional power control multiplier
PL: Path loss measurement (original)
$\Delta_{TF}$: Modulation and coding scheme offset
f: Closed loop power control Equation (1) could further be modified to define the uplink PUSCH power including any additional terms incorporated as part of the 5G standard where the path loss PL is modified to incorporate the correction factor AT(φ). The fractional power control multiplier α is a value between 0 and 1 that determines the effect of path loss PL compensation in the uplink PUSCH power. In conventional power control scenarios, uplink Signal to Interference Noise Ratio (SINR) is kept constant. As the user equipment increases its distance to the base station, the path loss increases, and to maintain constant uplink SINR the power of the user equipment increases to cancel the path loss effect. This is achieved by setting α=1. In fractional power control scenarios, the base station allows for the uplink SINR to reduce as the distance of the user equipment increases. This is achieved by setting the control multiplier α to a value less than 1. The key benefit of fractional power control is to reduce inter-cell interference and hence boost the average cell throughput.

The corresponding uplink PUCCH (Physical Uplink Control Channel) power control at the user equipment 10 is calculated including the subtraction of the correction factor AT(φ) from the path loss PL. For example, the PUCCH power can be calculated as the minimum of the configured uplink transmit power ($P_{CMAX}$) and the sum of the nominal user equipment transmitted power for the PUCCH ($P_{O\_PUCCH}$), the PUCCH format offset ($\Delta_{F\_PUCCH}$), the closed loop power control explicit for the PUCCH (g), the modulation and coding scheme offset ($\Delta_{TF}$), a quantity ten times the logarithm of allocated resource blocks for PUCCH ($M_{RB}^{PUCCH}$), and the correction factor (AT(φ)) subtracted from the path loss (PL). The uplink PUCCH (Physical Uplink Control Channel) power control modified by the correction factor can also be expressed as follows:

$$P_{PUSCH}(\phi) = \min \quad (2)$$
$$\left\{ \begin{array}{l} P_{CMAX} \\ P_{O\_PUSCH} + 10\log_{10}(M_{RB}^{PUSCH}) + PL - AT(\phi) + \Delta_{F\_PUCCH} + \Delta_{TF} + fg \end{array} \right.$$

where
$P_{O\_PUCCH}$: Nominal user equipment transmit power for the PUCCH
$M_{RB}^{PUCCH}$: Allocated Resource Blocks for the PUCCH
$\Delta_{F\_PUCCH}$: PUCCH Format offset
g: Closed loop power control explicit for the PUCCH Equation (2) could further be modified to define the uplink PUCCH power including any additional terms incorporated as part of the 5G standard where the path loss PL is modified to incorporate the correction factor AT(φ).

The corresponding SRS (Sounding Reference Signal) power control at the user equipment 10 is calculated including the subtraction of the correction factor AT(φ) from the path loss PL. For example, the SRS power can be calculated as the minimum of the configured uplink transmit power ($P_{CMAX}$) and the sum of the nominal user equipment transmitted power for the SRS ($P_{O\_SRS}$), the closed loop power control explicit for the SRS (h), a quantity ten times the logarithm of allocated resource blocks for SRS ($M_{SRS}$), and the correction factor (AT (φ)) subtracted from the path loss (PL) multiplied by the fractional power control multiplier for SRS ($\alpha_{SRS}$). The uplink SRS (Sounding Reference Signal) power control modified by the correction factor can also be expressed as follows:

$$P_{SRS}(\phi) = \min\left\{ \begin{array}{l} P_{CMAX} \\ P_{O\_SRS} + 10\log_{10}(M_{SRS}) + \alpha_{SRS} PL - \alpha_{SRS} AT(\phi) + h \end{array} \right. \quad (3)$$

where
$P_{O\_SRS}$: Nominal UE transmit power for the SRS
$M_{SRS}$: Allocated Resource Blocks for the SRS
$\alpha_{SRS}$: Fractional power control multiplier for SRS
h: Closed loop power control explicit for the SRS Equation (3) could further be modified to define the uplink SRS power including any additional terms incorporated as part of the 5G standard where the path loss PL is modified to incorporate the correction factor AT(φ). The fractional power control multiplier $\alpha_{SRS}$ is a value between 0 and 1 that determines the effect of path loss compensation in the uplink SRS power. As discussed above in relation to α, when the user equipment increases its distance to the base station, the path loss increases, and to maintain constant uplink SINR the power of the user equipment increases to cancel the path loss effect. This is achieved by setting $\alpha_{SRS}$=1. In fractional power control scenarios, the base station allows for the uplink SINR to reduce as the distance of the user equipment increases. This is achieved by setting the control multiplier $\alpha_{SRS}$ to a value less than 1. The key benefit of fractional power control is to reduce inter-cell interference and hence boost the average cell throughput.

The corresponding PRACH (Physical Random Access Channel) power control at the user equipment 10 is calculated including the subtraction of the correction factor AT(φ) from the path loss PL. For example, the PRACH power control can be calculated as the minimum of the configured uplink transmit power ($P_{CMAX}$) and the sum of the configured uplink transmit power ($P_{CMAX}$) and the path loss (PL) modified to incorporate the correction factor (AT(φ)). The PRACH (Physical Random Access Channel) power control can also be expressed as follows:

$$P_{PRACH}(\phi) = \min\left\{ \begin{array}{l} P_{CMAX} \\ P_{CMAX} + PL - AT(\phi) \end{array} \right. \quad (4)$$

Equation (4) could further be modified to define the uplink PRACH power including any additional terms incorporated as part of the 5G standard where the path loss PL is modified to incorporate the correction factor AT(φ).

The PHR (Power Headroom Reporting) calculations at the user equipment 10 also includes the correction factor calculated, including the subtraction of the correction factor AT(φ) from the path loss PL. The user equipment 10 sends the power headroom to the base station 20 where the scheduler uses the power headroom to compute the path loss and to derive the number of resource blocks. There are two types of power headroom: $PH_{type\ 1}(\phi)$ and $PH_{type\ 3}(\phi)$ which correspond to the power headroom report based on an actual PUSCH transmission and a power headroom report based on an actual SRS transmission respectively. Rather than computing the minimum of two quantities as defined in equations (1) and (3) for PUSCH and SRS respectively, the power headroom calculates the difference between these quantities. A positive PHR indicated availability of power, a negative value indicates the UE has reached its maximum transmit power. Specifically, $PH_{type\ 1}(\phi)$ and $PH_{type\ 3}(\phi)$ are defined as:

$$PH_{type1}(\phi) = P_{CMAX} - \{P_{O\_PUSCH} + 10 \log_{10}(M_{RB}^{PUSCH}) + \alpha PL - \alpha AT(\phi) + \Delta_{TF} + f\} \quad (5)$$

$$PH_{type3}(\phi) = P_{CMAX} - \{P_{O\_SRS} + 10 \log_{10}(M_{SRS}) + \alpha_{SRS} PL - \alpha_{SRS} AT(\phi) + h\} \quad (6)$$

Equations (5) and (6) could further be modified to define the uplink power head room including any additional terms incorporated as part of the 5G standard where the path loss PL is modified to incorporate the correction factor $AT(\phi)$.

By correcting the uplink reports at the user equipment 10, the discrepancy introduced by the correction factor $AT(\phi)$ at the second power amplifier 16 for a beam steering angle $\phi$ is corrected at the user equipment 10 and, as a result, an increased throughput can be achieved corresponding to the increased signal power achieved by the second power amplifier 16.

FIG. 5 schematically illustrates an alternative embodiment in which this discrepancy is corrected by including the correction factor $AT(\phi)$ at the hardware level. In the illustrated embodiment user equipment 50 communicates with base station 20. User equipment 50 comprises a number of components that are already described with reference to FIG. 1. Hence, only the additional components will be described in detail here. The user equipment 50 comprises an antenna system 54 which further comprises second power amplifier 16 and beam steering circuitry 18. In addition, antenna system 54 comprises low noise amplifier 52 to amplify the signal received from the base station without significantly degrading its signal-to-noise ratio. Signals received from the base station 20 by the antenna array 22 are passed by antenna system 54 through the low noise amplifier 52 before being passed to the baseband and RF unit 14. The low noise amplifier 54 amplifies the received signal by a gain that is dependent on the correction factor $AT(\phi)$ which is dependent on the beam steering angle $\phi$, and is chosen to be equal to the gain of the second power amplifier 16 for all beam steering angles $\phi$. In this way the discrepancy introduced by the second power amplifier 16 is eliminated prior to the calculation of the transmission loss by the calculation circuitry of the control circuitry 15 and prior to the reception of the signal at the baseband and RF unit, resulting in an increased transmission efficiency as a result of the increased signal power. Thus, the inclusion of the low noise amplifier 54 eliminates the need for including the correction factor $AT(\phi)$ at the software level.

FIG. 6a schematically illustrates a sequence of steps carried out by the base station 20 according to some examples of the present technology. At step S60 the base station transmits and receives resource blocks with user equipment 10 based on a current resource block allocation, for example, as illustrated in FIG. 4a. At step S62 the base station 20 receives an indication of a path loss from the user equipment 10. At step S64 the base station calculates a new resource block allocation and indicates the new resource block allocation to the user equipment 20 (UE). Flow then returns to step S60.

FIG. 6b schematically illustrates a sequence of steps carried out by the user equipment 10 communicating with the base station 20 according to some examples of the invention. The base station 20 is assumed to undertake the sequence of steps set out in FIG. 6a. At step S70 the user equipment 20 (as illustrated in FIG. 1) uses antenna control 26 and beam steering circuitry 18 to set the beam steering angle $\phi$ based on a relative direction of the base station. At step S72 the user equipment amplifies the signal to be output by the correction factor $AT(\phi)$. The correction factor $AT(\phi)$ is set equal to the power added or subtracted in 16 PA2. At step S74 the user equipment 10 transmits the amplified signal at angle $\phi$ to the base station 20 based on a resource block allocation that has been received from the base station 20 in accordance with the steps set out in FIG. 6a. At step S76 the user equipment 10 receives a signal at the angle $\phi$ from the base station 20. At step S78 the user equipment calculates the path loss based on a difference between the power of the transmitted signal from the base station and the received signal at the user equipment. As the transmitted signal has been amplified by the correction factor $AT(\phi)$, there will be a discrepancy between the transmitted and received power based on the correction factor $AT(\phi)$ and based on the transmission losses. At step S80 the path loss is corrected in software at the user equipment 10 by subtracting the correction factor $AT(\phi)$ from the path loss during calculation of the PRACH (Physical Random Access Channel) power, the SRS (Sounding Reference Signal) power, the PUSCH (Physical Uplink Shared Channel) power, the PUCCH (Physical Uplink Control Channel) power, and the PHR (Power Headroom Reporting). At step S82 the user equipment transmits signals containing an indication of the corrected path loss to the user equipment, for example, through transmission of the PHR corrected by the correction factor set out in equations (5) and (6). At step S84, the user equipment receives a resource block allocation from the base station 20 based on the path loss. Flow then returns to step S70.

FIG. 6c schematically illustrates a set of steps carried out in the alternative embodiment illustrated in FIG. 5. The base station 50 is assumed to undertake the sequence of steps set out in FIG. 6a. Steps S70-S76 are identical to those described in FIG. 6b. At step S86 the signal that has been received at an angle $\phi$ is amplified by low noise amplifier 52 by the correction factor $AT(\phi)$. At step S88 the user equipment 50 calculates the path loss based on a difference between the power of the transmitted signal at the base station and the power of the amplified received signal (i.e., the signal that was received in step S76 and then subsequently amplified in step S86). As both the transmitted signal and the received signal have each been amplified by the correction factor $AT(\phi)$, the discrepancy between the transmitted and received power based on the correction factor $AT(\phi)$ (as described with reference to FIG. 6b, step S78) is already accounted for and there is no need to apply the software based correction factors as described in FIG. 6b, step S80. At step S90 the user equipment 50 transmits a signal including an indication of the path loss to the base station 20. Flow then returns to step S84 which is identical to that described in reference to FIG. 6b.

Of course, it will be appreciated that in some embodiments, the path loss that is transmitted to the base station in FIG. 6b could be based on the correction factor (e.g. by adding, subtracting, multiplying or dividing by a constant that can be determined at the base station side). Similarly, the correction factor that is used in FIG. 6c for performing gain adjustment of the incoming signal could be adjusted in other ways for other purposes not directly relevant to the present disclosure.

FIG. 7 schematically illustrates a sequence of steps according to some embodiments of the invention. At step S91 the wireless radio system adjusts, based on a scan loss of an outgoing signal due to beamforming, a transmission power of the outgoing signal by a scan loss adjustment amount to produce an adjusted signal. At step S92 the wireless radio system transmits the adjusted signal. At step S94 the wireless radio system receives an incoming signal at a reception power. Finally, at step S96 the wireless radio system adjusts the reception power of the incoming signal based on the scan loss adjustment amount to produce an adjusted input signal.

FIG. 8 schematically illustrates a sequence of steps according to some embodiments of the invention. In particular, FIG. 8 relates to embodiments in which the path loss calculation is corrected by the use of software. In these embodiments, at step S100, a scan loss of an outgoing signal due to beamforming is determined. At step S102, a transmission power of the outgoing signal is adjusted by a scan loss adjustment amount. At a step S104, the adjusted signal is transmitted. At a step S106, an incoming signal is received at a reception power. At step S108, the path loss is calculated (e.g. by control circuitry 15) and is adjusted (e.g. by the control circuitry 15) as previously described. For example, the previously described correction factor $AT(\phi)$ could be added to the path loss calculation. Then, the corrected path loss is reported (e.g. to a base station) in step S110.

In brief overall summary at least some embodiments provide a wireless radio system comprising: compensation circuitry to adjust, based on a scan loss of an outgoing signal due to beamforming, a transmission power of the outgoing signal by a scan loss adjustment amount to produce an adjusted signal; transmission circuitry to transmit the adjusted signal; reception circuitry to receive an incoming signal at a reception power; input adjustment circuitry configured to adjust the reception power of the incoming signal based on the scan loss adjustment amount to produce an adjusted input signal.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:
1. A wireless radio system comprising:
compensation circuitry to adjust, based on a scan loss of an outgoing signal due to beamforming, a transmission power of the outgoing signal by a scan loss adjustment amount to produce an adjusted signal;
transmission circuitry to transmit the adjusted signal;
reception circuitry to receive an incoming signal at a reception power;
calculation circuitry to perform a calculation of a path loss based on a difference between the transmission power and the reception power, and to adjust the path loss; and
reporting circuitry to report an indication of the path loss adjusted by the calculation circuitry to a base station,
wherein the calculation circuitry adjusts the path loss based on the scan loss adjustment amount.
2. The wireless radio system according to claim 1, wherein
the scan loss adjustment amount is limited to a maximum value so that the adjusted signal's transmission power is below a regulatory limit.
3. The wireless radio system according to claim 1, wherein
the transmission circuitry comprises an antenna array to steer a transmission beam corresponding to the outgoing signal at a plurality of angles, wherein
the scan loss is dependent on a steered direction, which is one of the plurality of angles at which the transmission beam is steered.
4. The wireless radio system according to claim 3, wherein
a gain at the steered angle of the transmission beam transmitted at the steered angle is below a gain at a peak transmission angle of the transmission beam transmitted at the steered angle.
5. The wireless radio system according to claim 3, wherein
the scan loss is a difference between a maximum gain of the antenna array across all of the plurality of angles and a maximum gain of the transmission beam transmitted at the steered angle.
6. The wireless radio system according to claim 1, wherein
the transmission circuitry is adapted to transmit the adjusted signal to a wireless node during a subset of a plurality of resource blocks; and
the reception circuitry is adapted to receive the incoming signal from the wireless node.
7. The wireless radio system according to claim 6, wherein
the wireless node is configured to allocate the subset of the plurality of resource blocks to the wireless radio system.
8. The wireless radio system according to claim 6, wherein
the wireless node is configured to allocate the subset of the plurality of resource blocks to the wireless radio system based on the path loss reported by the reporting circuitry of the wireless radio system.
9. The wireless radio system according to claim 1, wherein
the path loss is adjusted by compensating for the scan loss adjustment amount.
10. The wireless radio system according to claim 1, wherein
the path loss is adjusted by discounting the scan loss adjustment amount.

11. The wireless radio system according to claim 1, wherein
the compensation circuitry is an amplifier.

12. The wireless radio system according to claim 1, wherein
the outgoing signal and the adjusted signal are RF signals.

13. The wireless radio system according to claim 1, comprising:
further compensation circuitry to adjust a power of a baseband signal to produce the outgoing signal at the transmission power.

14. The wireless radio system according to claim 1, wherein the scan loss is dependent on a steered angle of the outgoing signal.

15. A method comprising:
adjusting, based on a scan loss of an outgoing signal due to beamforming, a transmission power of the outgoing signal by a scan loss adjustment amount to produce an adjusted signal;
transmitting the adjusted signal;
receiving an incoming signal at a reception power;
performing a calculation of a path loss based on a difference between the transmission power and the reception power, and adjusting the path loss; and
reporting an indication of the path loss adjusted by the adjusting of the path loss to a base station,
wherein the path loss is adjusted based on the scan loss adjustment amount.

16. A wireless radio system comprising:
means for adjusting, based on a scan loss of an outgoing signal due to beamforming, a transmission power of the outgoing signal by a scan loss adjustment amount to produce an adjusted signal;
means for transmitting the adjusted signal;
means for receiving an incoming signal at a reception power;
means for performing a calculation of a path loss based on a difference between the transmission power and the reception power, and for adjusting the path loss; and
means for reporting an indication of the path loss adjusted by the means for performing and adjusting to a base station,
wherein the path loss is adjusted based on the scan loss adjustment amount.

* * * * *